(12) United States Patent
Buset et al.

(10) Patent No.: US 12,425,118 B2
(45) Date of Patent: Sep. 23, 2025

(54) TURN UP AND EXPRESS TRAFFIC VALIDATION FOR COMMUNICATION SYSTEMS

(71) Applicant: Infinera Corp., San Jose, CA (US)

(72) Inventors: Jonathan Michael Buset, San Jose, CA (US); Nisar Ahmed, Bellevue, WA (US); Francisco Javier Vaquero Caballero, San Jose, CA (US); Thomas Gerard, Campbell, CA (US); Stephane St-Laurent, Roxboro (CA)

(73) Assignee: Infinera Corp.

( * ) Notice: Subject to any disclaimer, the term of this patent is extended or adjusted under 35 U.S.C. 154(b) by 109 days.

(21) Appl. No.: 18/173,664

(22) Filed: Feb. 23, 2023

(65) Prior Publication Data
US 2023/0269020 A1  Aug. 24, 2023

Related U.S. Application Data

(60) Provisional application No. 63/313,007, filed on Feb. 23, 2022.

(51) Int. Cl.
*H04J 14/02* (2006.01)
*H04B 10/079* (2013.01)
*H04B 10/50* (2013.01)

(52) U.S. Cl.
CPC .... *H04J 14/02126* (2023.08); *H04B 10/0795* (2013.01); *H04B 10/506* (2013.01); *H04J 14/0205* (2013.01); *H04J 14/0212* (2013.01); *H04J 14/0221* (2013.01); *H04J 14/0307* (2023.08)

(58) Field of Classification Search
None
See application file for complete search history.

(56) References Cited

U.S. PATENT DOCUMENTS

| | | | |
|---|---|---|---|
| 2009/0116840 A1* | 5/2009 | Perasso | H04J 14/0213 398/79 |
| 2014/0348464 A1* | 11/2014 | Kamura | H04B 10/25133 385/24 |
| 2016/0344481 A1* | 11/2016 | Vassilieva | H04J 14/02216 |
| 2017/0019204 A1* | 1/2017 | Yilmaz | H04J 14/02216 |
| 2017/0353264 A1* | 12/2017 | Rao | H04J 14/02216 |
| 2018/0076919 A1* | 3/2018 | Yilmaz | H04J 14/0212 |
| 2018/0270009 A1* | 9/2018 | Mansouri Rad | H04Q 11/0005 |

(Continued)

*Primary Examiner* — Li Liu

(57) ABSTRACT

A multiplexer module and method are herein disclosed. The multiplexer module comprises a WSS configured to receive a plurality of first optical signals, selectively multiplex the first optical signals into a second optical signal, and output the second optical signal; an OPM operable to determine a power of one or more slice within a sample optical signal, the sample optical signal being selected from a group consisting of a particular optical signal of the first optical signals and a portion of the second optical signal including the particular optical signal; a processor; and a memory storing instructions that cause the processor to: validate the particular optical signal using the power of one or more slice within the sample optical signal; and if the particular optical signal is valid, cause the WSS to open a particular passband so as to multiplex the particular optical signal into the second optical signal.

21 Claims, 4 Drawing Sheets

(56) References Cited

U.S. PATENT DOCUMENTS

2019/0149229 A1* 5/2019 Yilmaz ............. H04B 10/0795
  398/10
2020/0059712 A1* 2/2020 Satyarthi ............. H04J 14/0212
2020/0112365 A1* 4/2020 Satbhaiya ........... H04J 14/0287

* cited by examiner

TURN UP AND EXPRESS TRAFFIC VALIDATION FOR COMMUNICATION SYSTEMS

CROSS-REFERENCE TO RELATED APPLICATIONS

This application claims priority to U.S. Provisional Patent Application No. 63/313,007, filed Feb. 23, 2022, the entire content of which is incorporated herein by reference in its entirety.

DESCRIPTION OF THE PRIOR ART

Optical networking is a communication means that utilizes signals encoded in light to transmit information, e.g., data, as an optical signal in various types of telecommunications networks. Optical networking may be used in relatively short-range networking applications such as in a local area network (LAN) or in long-range networking applications spanning countries, continents, and oceans. Generally, optical networks utilize optical amplifiers, a light source such as lasers or LEDs, and wavelength division multiplexing to enable high-bandwidth communication.

Optical networks are a critical component of the global Internet backbone. This infrastructure acts as the underlay, providing the plumbing for all other communications to take place (e.g., access, metro, and long-haul). In the traditional 7-layer OSI model, Optical networks constitute the Layer 1 functions, providing digital transmission of bit streams transparently across varying distances over a chosen physical media (in this case, optical). Optical networks also encompass an entire class of devices (which are referred to as Layer 0), which purely deal with optical photonic transmission and wavelength division multiplexing (WDM). This includes amplification, (re-)generation, and optical add/drop multiplexing (OADM). The most widely adopted Layer 1/Layer 0 transport networking technologies today, referred to as Optical Transport Networks (OTN), are based on ITU-T standards. Both these classes of networks are connection-oriented and circuit-switched in nature.

Dense Wavelength Division Multiplexing (DWDM) is an optical transmission technology that uses a single fiber optic line to simultaneously transport multiple optical services of different wavelengths. The different wavelengths are conventionally separated into several frequency bands, each frequency band being used as an independent channel to transport optical services of particular wavelengths. The Conventional Band (C-band) typically includes signals with wavelengths ranging from 1530 nm to 1565 nm, is the frequency band in which optical services experience the lowest amount of loss, and is the band most commonly used in DWDM. The Long-wavelength Band (L-band), which typically includes signals with wavelengths ranging from 1565 nm to 1625 nm, is the frequency band in which optical services experience the second lowest amount of loss, and is the frequency band often used when the C-band is insufficient to meet bandwidth requirements. Optical line systems that use both the C-band and the L-band are referred to as C+L or C/L optical line systems C+L optical line systems may be susceptible to experiencing optical power transients during loading operations due to the Stimulated Raman Scattering (SRS) effect across the different frequency bands. This can lead to traffic drop on pre-existing services in one frequency band if there is a significant loading change in the other frequency band.

SUMMARY OF THE INVENTION

In C+L-band networks, services in a particular band (i.e., the C-band or the L-band) should be carefully loaded to minimize the effects of optical power changes on pre-existing services in the other band. This is due to the SRS effect.

In one implementation, the problems of mitigating or limiting transients and the SRS effect when loading services in an optical network is solved by a multiplexer module, comprising: a wavelength selective switch configured to receive a plurality of first optical signals within a plurality of passbands, selectively multiplex the first optical signals within the plurality of passbands into a second optical signal, and output the second optical signal; an optical performance monitor operable to receive a sample optical signal and determine a power of one or more slice within the sample optical signal, the sample optical signal being selected from a group consisting of a particular optical signal of the first optical signals and a portion of the second optical signal including the particular optical signal; a controller processor; and a controller memory.

The controller memory is a non-transitory processor-readable memory storing processor-executable instructions, that when executed by the controller processor, cause the controller processor to: validate the particular optical signal of the plurality of first optical signals using the power of one or more slice within the sample optical signal; and if the particular optical signal of the plurality of first optical signals is valid, cause the wavelength selective switch to open a particular passband so as to multiplex the particular one of the plurality of first optical signals into the second optical signal.

In another implementation, the problems of mitigating or limiting transients and the SRS effect when loading services in an optical network is solved by a method, comprising: receiving, by a wavelength selective switch, a plurality of first optical signals, the wavelength selective switch being operable to selectively output a second optical signal comprising one or more passband of the plurality of first optical signals; validating a particular optical signal of the plurality of first optical signals based at least in part on a power measured by an optical performance monitor; and if the particular optical signal is validated, multiplexing, by the wavelength selective switch, the particular optical signal of the plurality of first optical signals into the second optical signal.

BRIEF DESCRIPTION OF THE DRAWINGS

The accompanying drawings, which are incorporated in and constitute a part of this specification, illustrate one or more implementations described herein and, together with the description, explain these implementations. The drawings are not intended to be drawn to scale, and certain features and certain views of the figures may be shown exaggerated, to scale, or in schematic in the interest of clarity and conciseness. Not every component may be labeled in every drawing. Like reference numerals in the figures may represent and refer to the same or similar element or function. In the drawings.

DETAILED DESCRIPTION

Figure 1:
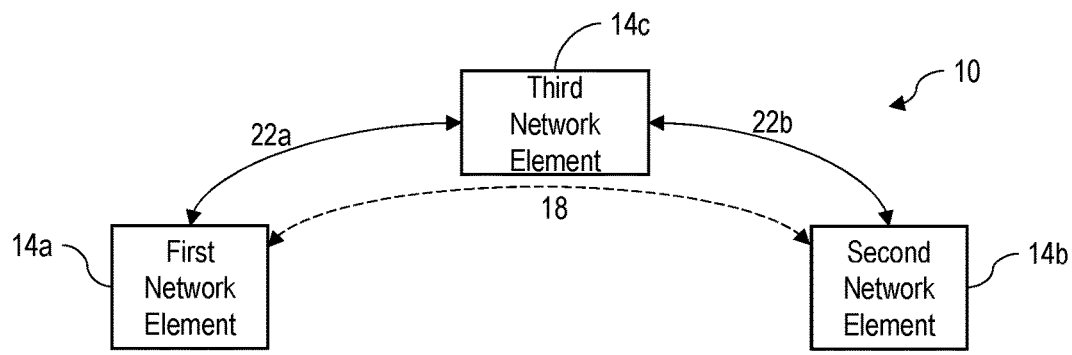
FIG. 1 is a block diagram of an exemplary implementation of an optical transport network constructed in accordance with the present disclosure.

The following detailed description of exemplary embodiments refers to the accompanying drawings. The same reference numbers in different drawings may identify the same or similar elements.

Before explaining at least one embodiment of the disclosure in detail, it is to be understood that the disclosure is not limited in its application to the details of construction, experiments, exemplary data, and/or the arrangement of the components set forth in the following description or illustrated in the drawings unless otherwise noted.

The disclosure is capable of other embodiments or of being practiced or carried out in various ways. Also, it is to be understood that the phraseology and terminology employed herein are for purposes of description and should not be regarded as limiting.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concept. This description should be read to include one or more and the singular also includes the plural unless it is obvious that it is meant otherwise. Further, use of the term "plurality" is meant to convey "more than one" unless expressly stated to the contrary.

As used herein, qualifiers like "about," "approximately," and combinations and variations thereof, are intended to include not only the exact amount or value that they qualify, but also some slight deviations therefrom, which may be due to manufacturing tolerances, measurement error, wear and tear, stresses exerted on various parts, and combinations thereof, for example.

The use of the term "at least one" or "one or more" will be understood to include one as well as any quantity more than one. In addition, the use of the phrase "at least one of X, Y, and Z" will be understood to include X alone, Y alone, and Z alone, as well as any combination of X, Y, and Z.

The use of ordinal number terminology (i.e., "first", "second", "third", "fourth", etc.) is solely for the purpose of differentiating between two or more items and, unless explicitly stated otherwise, is not meant to imply any sequence or order or importance to one item over another or any order of addition.

As used herein, any reference to "one embodiment," "an embodiment," "some embodiments," "one implementation," "some implementations," "an implementation," "one example," "for example," or "an example" means that a particular element, feature, structure, or characteristic described in connection with the embodiment/implementation/example is included in at least one embodiment/implementation/example and may be used in conjunction with other embodiments/implementations/examples. The appearance of the phrase "in some embodiments" or "one example" or "in some implementations" in various places in the specification does not necessarily all refer to the same embodiment/implementation/example, for example.

Circuitry, as used herein, may be analog and/or digital components referred to herein as "blocks", or one or more suitably programmed processors (e.g., microprocessors) and associated hardware and software, or hardwired logic. Also, "components" or "blocks" may perform one or more functions. The term "component" or "block" may include hardware, such as a processor (e.g., a microprocessor), a combination of hardware and software, and/or the like. Software may include one or more processor-executable instructions that when executed by one or more components cause the component to perform a specified function. It should be understood that the algorithms described herein may be stored on one or more non-transitory memory. Exemplary non-transitory memory may include random access memory, read-only memory, flash memory, and/or the like. Such non-transitory memory may be electrically based, optically based, and/or the like.

Software may include one or more processor-readable instruction that when executed by one or more component, e.g., a processor, causes the component to perform a specified function. It should be understood that the algorithms described herein may be stored on one or more non-transitory processor-readable medium, which is also referred to herein as a non-transitory memory. Exemplary non-transitory processor-readable mediums may include random-access memory (RAM), a read-only memory (ROM), a flash memory, and/or a non-volatile memory such as, for example, a CD-ROM, a hard drive, a solid-state drive, a flash drive, a memory card, a DVD-ROM, a Blu-ray Disk, a disk, and an optical drive, combinations thereof, and/or the like. Such non-transitory processor-readable media may be electrically based, optically based, magnetically based, and/or the like. Further, the messages described herein may be generated by the components and result in various physical transformations.

As used herein, the terms "network-based," "cloud-based," and any variations thereof, are intended to include the provision of configurable computational resources on demand via interfacing with a computer and/or computer network, with software and/or data at least partially located on a computer and/or computer network.

The generation of laser beams for use as optical data channel signals is explained, for example, in U.S. Pat. No. 8,155,531, entitled "Tunable Photonic Integrated Circuits", issued Apr. 10, 2012, and U.S. Pat. No. 8,639,118, entitled "Wavelength division multiplexed optical communication system having variable channel spacings and different modulation formats," issued Jan. 28, 2014, which are hereby fully incorporated in their entirety herein by reference.

As used herein, an "optical communication path" and/or an "optical route" may correspond to an optical path and/or an optical light path. For example, an optical communication path may specify a path along which light is carried between two or more network entities along a fiber optic link, e.g., an optical fiber.

The optical network has one or more band. A band is the complete optical spectrum carried on the optical fiber. Depending on the optical fiber used and the supported spectrum which can be carried over long distances with the current technology, relevant examples of the same are: C-Band/L-Band/Extended-C-Band. As used herein, the C-Band is a band of light having a wavelength between about 1530 nm and about 1565 nm. The L-Band is a band of light having a wavelength between about 1565 nm and about 1625 nm. Because the wavelength of the C-Band is smaller than the wavelength of the L-Band, the wavelength of the C-Band may be described as a short, or a shorter, wavelength relative to the L-Band. Similarly, because the wavelength of the L-Band is larger than the wavelength of the C-Band, the wavelength of the L-Band may be described as a long, or a longer, wavelength relative to the C-Band.

As used herein, a spectral slice (a "slice") may represent a spectrum of a particular size in a frequency band (e.g., 12.5 gigahertz ("GHz"), 6.25 GHz, 3.125 GHz, etc.). For example, a 4.8 terahertz ("THz") frequency band may include 384 spectral slices, where each spectral slice may represent 12.5 GHz of the 4.8 THz spectrum. A slice may be the resolution at which the power levels can be measured by the optical power monitoring device. The power level being measured by the optical power monitoring device represents the total optical power carried by the portion of the band represented by that slice.

Spectral loading, or channel loading, is the addition of one or more channel to a specific spectrum of light described by the light's wavelength in an optical signal. When all channels within a specific spectrum are being utilized, the specific spectrum is described as fully loaded. A grouping of two or more channel may be called a channel group. Spectral loading may also be described as the addition of one or more channel group to a specific spectrum of light described by the light's wavelength to be supplied onto the optical fiber as the optical signal.

A WSS (Wavelength Selective Switch) is a component used in optical communications networks to route (switch) optical signals between optical fibers on a per-slice basis. Generally, power level controls can also be done by the WSS by specifying an attenuation level on a passband filter. A Wavelength Selective Switch is a programmable device having source and destination fiber ports where the source and destination fiber ports and associated attenuation can be specified for a particular passband with a minimum bandwidth. The minimum bandwidth may be, for example, a slice. In one implementation, for example, the wavelength selective switch is operable to apply an attenuation for a particular passband having a first bandwidth and the optical power monitoring device has a resolution of a second bandwidth. The first bandwidth and the second bandwidth may be different (for example, the first bandwidth may be 12.5 GHz and the second bandwidth may be 3.125 GHz). In this implementation, then, the WSS may have a different slice width than the optical power monitor slice width.

A reconfigurable optical add-drop multiplexer (ROADM) node is an all-optical subsystem that enables remote configuration of wavelengths at any ROADM node, in other words, a ROADM enables optical switching of an optical signal without requiring conversion of the optical signal from an optical domain into an electrical or digital domain. A ROADM is software-provisionable so that a network operator can choose whether a wavelength is added, dropped, or passed through the ROADM node. The technologies used within the ROADM node include wavelength blocking, planar lightwave circuit (PLC), and wavelength selective switching—though the WSS has become the dominant technology. A ROADM system is a metro/regional WDM or long-haul DWDM system that includes a ROADM node. ROADMs are often talked about in terms of degrees of switching, ranging from a minimum of two degrees to as many as eight degrees, and occasionally more than eight degrees. A "degree" is another term for a switching direction and is generally associated with a transmission fiber pair. A two-degree ROADM node switches in two directions, typically called East and West. A four-degree ROADM node switches in four directions, typically called North, South, East, and West. In a WSS-based ROADM network, each degree requires an additional WSS switching element. So, as the directions switched at a ROADM node increase, the ROADM node's cost increases.

An exemplary optical transport network consists of two distinct domains: Layer 0 ("optical domain" or "optical layer") and Layer 1 ("digital domain") data planes. Layer 0 is responsible for fixed or reconfigurable optical add/drop multiplexing (R/OADM) and optical amplification (EDFA or Raman) of optical channels and optical channel groups (OCG), typically within the 1530 nm-1565 nm range, known as C-Band. ROADM functions are facilitated via usage of a combination of colorless, directionless, and contentionless (CDC) optical devices, which may include wavelength selective switches (WSS), Multicast switches (MCS). Layer 0 may include the frequency grid (for example, as defined by ITU G.694.1), ROADMs, FOADMs, Amps, Muxes, Line-system and Fiber transmission, and GMPLS Control Plane (with Optical Extensions). Layer 1 functions encompass transporting client signals (e.g., Ethernet, SONET/SDH) in a manner that preserves bit transparency, timing transparency, and delay-transparency. The predominant technology for digital layer data transport in use today is OTN (for example, as defined by ITU G.709). Layer 1 may transport "client layer" traffic. Layer 1 may be a digital layer including multiplexing and grooming. The optical layer may further be divided into either an OTS layer or an OCH layer. The OTS layer refers to the optical transport section of the optical layer, whereas the OCH layer refers to one or more optical channels which are co-routed, e.g., together as multiple channels.

Referring now to the drawings, and in particular to FIG. 1, shown therein is a diagram of an exemplary implementation of an optical transport network 10 constructed in accordance with the present disclosure. The optical transport network 10 is depicted as having a plurality of network elements 14a-n, including a first network element 14a, a second network element 14b, and a third network element 14c. Though three network elements 14 are shown for exemplary purposes, it will be understood that the plurality of network elements 14a-n may comprise more or fewer network elements 14. Data transmitted within the optical transport network 10 from the first network element 14a to the second network element 14b may travel along an optical path 18 formed from a first optical fiber link 22a, the third network element 14c, and, a second optical fiber link 22b to the second network element 14b.

The optical transport network 10 may be, for example, considered as a graph made up of interconnected individual nodes (that is, the network elements 14). In one embodiment, the optical transport network 10 may include any type of network that uses light as a transmission medium. For example, the optical transport network 10 may include a fiber-optic based network, an optical transport network, a light-emitting diode network, a laser diode network, an infrared network, a wireless optical network, a wireless network, combinations thereof, and/or other types of optical networks.

The number of devices and/or networks illustrated in FIG. 1 is provided for explanatory purposes. In practice, there may be additional devices and/or networks, fewer devices and/or networks, different devices and/or networks, or differently arranged devices and/or networks than are shown in FIG. 1. Furthermore, two or more of the devices illustrated in FIG. 1 may be implemented within a single device, or a single device illustrated in FIG. 1 may be implemented as multiple, distributed devices. Additionally, or alternatively, one or more of the devices of the optical transport network 10 may perform one or more functions described as being performed by another one or more of the devices of the optical transport network 10.

Figure 2:
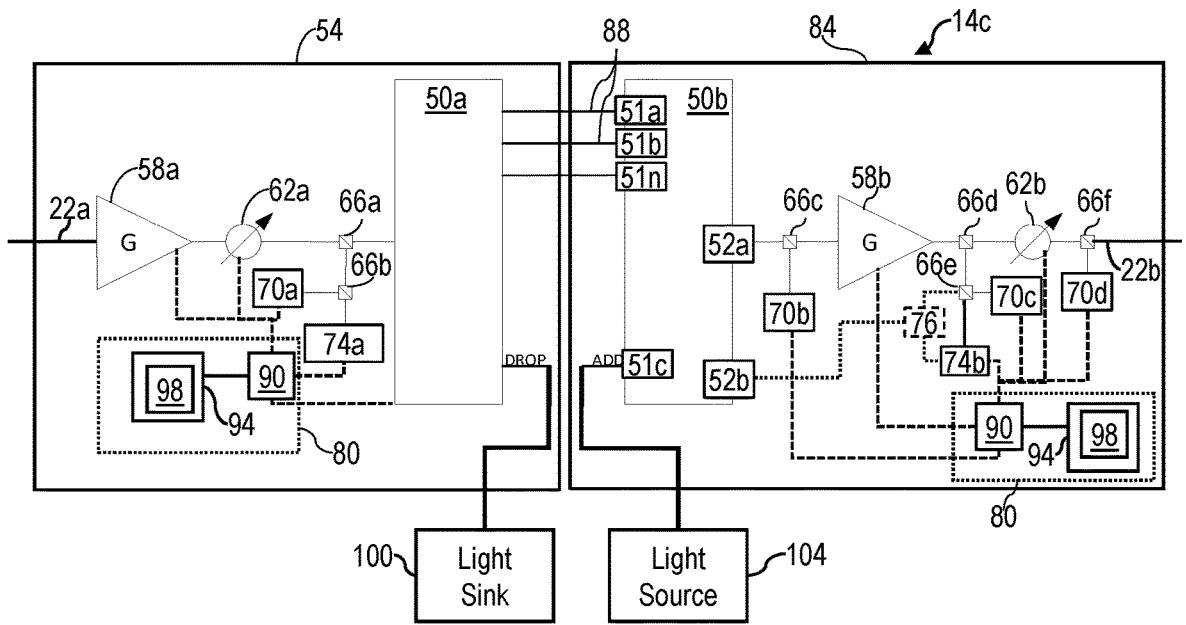
FIG. 2 is a block diagram of the third network element of FIG. 1 constructed in accordance with the present disclosure.

Referring now to FIG. 2, shown therein is a block diagram of the third network element 14c of FIG. 1 constructed in accordance with the present disclosure. In general, the third network element 14c transmits and receives data traffic and control signals. The third network element 14c as shown in FIG. 2 is an exemplary implementation of any one of the network elements 14a-n of the optical transport network 10.

Nonexclusive examples of alternative implementations of the network element 14 include optical line terminals (OLTs), optical cross connects (OXCs), optical line amplifiers, optical add/drop multiplexer (OADMs) and/or reconfigurable optical add/drop multiplexers (ROADMs), interconnected by way of optical fiber links. OLTs may be used at either end of a connection or optical fiber link. OADM/ROADMs may be used to add, terminate and/or reroute wavelengths or fractions of wavelengths. Optical nodes are further described in U.S. Pat. No. 7,995,921 titled "Banded Semiconductor Optical Amplifiers and Waveblockers", U.S. Pat. No. 7,394,953 titled "Configurable Integrated Optical Combiners and Decombiners", and U.S. Pat. No. 8,223,803 (Application Publication Number 20090245289), titled "Programmable Time Division Multiplexed Switching," the entire contents of each of which are hereby incorporated herein by reference in its entirety.

FIG. 2 shows the third network element 14c as a ROADM that interconnects the first optical fiber link 22a and the second optical fiber link 22b. Each of the first optical fiber link 22a and the second optical fiber link 22b may include optical fiber pairs, wherein each fiber of the pair carries optical signal groups propagating in opposite directions. For simplicity, however, the third network element 14c is shown as unidirectional with an optical signal propagating from the first network element 14a through the first optical fiber link 22a and into the third network element 14c. The optical signal continues from the third network element 14c, through the second optical fiber link 22b to the second network element 14b.

In one embodiment, additional network elements 14, not shown in FIG. 2, may be provided that supply optical signals to and receive optical signals from the third network element 14c. Such network elements 14 may also have a ROADM having the same or similar structure as that of the third network element 14c.

As further shown in FIG. 2, a light sink 100 (described below in more detail and shown in FIG. 3A) and a light source 104 (described below in more detail and shown in FIG. 3B) may be provided and in communication with the third network element 14c to drop and add optical signals, respectively.

In one embodiment, the third network element 14c may include one or more wavelength selective switch 50 (WSS 50), such as a first WSS 50a and a second WSS 50b. As described above, wavelength selective switches are components that can dynamically route, block and/or attenuate received optical signals input from and output to optical fiber links 22a-n. In addition to transmitting/receiving optical signals from network elements 14, optical signals may also be input from or output to the light source 104 and light sink 100, respectively.

In one embodiment, each WSS 50 may be a reconfigurable, optical filter operable to allow one or more passbands (e.g., particular bandwidth(s) of the spectrum of the optical signal) to pass through or be routed as herein described.

In one embodiment, each WSS 50 can receive optical signals and may be operable to selectively switch, or direct, such optical signals to one or more other WSS 50 for output from the third network element 14c. The WSSs 50 may also selectively or controllably supply optical signals to the light sink 100 and optical signals may be selectively received from the light source 104 in the third network element 14c. The optical signals output from the light source 104 may be selectively supplied to one or more of the WSSs 50 for output to the second optical fiber link 22b.

In one embodiment, the first WSS 50a in combination with one or more optical elements, may be referred to as a DEMUX module 54. The DEMUX module 54 applies attenuations and filtering on an incoming optical signal before demultiplexing the incoming optical signal into one or more express optical signal or one or more drop optical signal. As shown in FIG. 2, the DEMUX module 54 may further comprise a first optical amplifier 58a, a first variable optical attenuator 62a (VOA 62a), a first optical splitter 66a, a second optical splitter 66b, a first photodetector 70a, and a first optical performance monitor 74a (first OPM 74a). In one implementation, the first OPM 74a is a coherent OPM thereby providing a higher resolution and power sensitivity on a power and frequency range of a received optical signal. A coherent OPM may be preferable, for example, if minimizing a transient impact due to a power of a first optical sample (described below) is desired. In one implementation, each OPM 74 may measure one or more optical characteristics of an optical signal, such as, for example, a power spectral density, a center frequency, an optical bandwidth, a shape, a channel slope, a channel roll-off, an average peak-to-floor ratio, and/or the like or some combination thereof.

In one embodiment, the first optical amplifier 58a may be any optical amplifier configured to increase or supplement an optical power of the optical signal. For example, the first optical amplifier 58a may be an Erbium doped fiber amplifier (EDFA).

In one embodiment, the first VOA 62a is an optical device operable to control attenuation (or insertion loss) according to an electrical control signal (e.g., received from a controller 80 (described below)). The insertion loss may be, for example, a calibrated known value.

As shown in FIG. 2, a first optical signal traveling along the first optical fiber link 22a enters the DEMUX module 54 and passes through the first optical amplifier 58a and the first VOA 62a before being split at the first optical splitter 66a where a first portion of the first optical signal continues to the first WSS 50a and a second portion of the first optical signal is split by the second optical splitter 66b and is directed to the first photodetector 70a and the first OPM 74a.

In one implementation, the third network element 14c may further include the controller 80 in communication with one or more optical element of the DEMUX module 54, such as the first optical amplifier 58a, the first VOA 62a, the first photodetector 70a, and the first OPM 74a. The controller 80 may further comprise a controller processor 90 and a non-transitory computer readable medium referred to herein as controller memory 94.

In one embodiment, the controller processor 90 may include, but is not limited to, a digital signal processor (DSP), a central processing unit (CPU), a field programmable gate array (FPGA), a microprocessor, a multi-core processor, an application specific integrated circuit (ASIC), combinations, thereof, and/or the like, for example. The controller processor 90 is in communication with the controller memory 94 and may be operable to read and/or write to the controller memory 94. The controller processor 90 may be capable of communicating with one or more of the WSSs 50.

In one embodiment, the controller processor 90 is configured to communicate with one or more of the first optical amplifier 58a, the first VOA 62a, the first photodetector 70a, and the first OPM 74a.

In some embodiment, the controller 80 may be integrated into the DEMUX module 54, however, in other embodiments, the controller 80 may be circuitry separate from, but in communication with, the DEMUX module 54.

In one implementation, the controller memory 94 of the third network element 14c may store a software application 98 that, when executed by the controller processor 90, causes the controller processor 90 to perform an action, such as, for example, communicate with, or control, e.g., via an electrical control signal, one or more optical element in the DEMUX module 54.

In one embodiment, the second WSS 50b in combination with one or more optical elements, may be referred to as a multiplexer module 84 (MUX module 84). As shown in FIG. 2, the MUX module 84 may further comprise a second optical amplifier 58b, a second variable optical attenuator 62b (second VOA 62b), a third optical splitter 66c, a fourth optical splitter 66d, a fifth optical splitter 66e, a sixth optical splitter 66f, a second photodetector 70b, a third photodetector 70c, a fourth photodetector 70d, and a second optical performance monitor 74b (second OPM 74b). In one embodiment, the second OPM 74b is a coherent OPM thereby providing a higher resolution and a higher power sensitivity on a power and frequency range of a received optical signal. The second OPM 74b implemented as the coherent OPM may be desirable in order to measure a power of a slice at a relatively low power (e.g., at a high WSS attenuation) compared to existing channels in an optical signal. By measuring the power of the slice at the relatively low power, transient effects (due to measurement) on the existing channels in the optical signal may be minimized.

As shown in FIG. 2, the one or more express optical signal, e.g., along an express path 88, and one or more add optical signal from the light source 104, is received by the second WSS 50b where each optical signal is selectively combined into a second optical signal transmitted from the second WSS 50b towards the second optical fiber link 22b. The second optical signal may pass through the third optical splitter 66c, where a first optical sample is directed towards the second photodetector 70b, and into the second optical amplifier 58b. The second optical signal continues through the fourth optical splitter 66d, which directs a second optical sample through the fifth optical splitter 66e and on to the third photodetector 70c and the second OPM 74b, and on to the second VOA 62b. After the second optical signal is attenuated by the second VOA 62b, the second optical signal passes through the sixth optical splitter 66f, where a third optical sample is directed to the fourth photodetector 70d, and on to the second optical fiber link 22b.

It should be noted that before the one or more express optical signals are multiplexed by the MUX module 84, a present power and frequency range for each of the one or more express optical signal (e.g., the one or more express optical signal received via a source port 51a-n, for example) is unknown; however, a provisioned power and frequency range is known, e.g., the power and frequency range of the optical signal when the optical signal was transmitted (or ADDed/multiplexed onto the optical signal, e.g., via one or more source port 51a-n). If the present power and frequency range of one or more of the ADD and/or express optical signals is incorrect, or outside expected bounds, unexpected transients may be introduced into the MUXed optical signal (i.e., the second optical signal), thereby degrading, or otherwise affecting, traffic loaded on the second optical signal. This problem is addressed by performing spectral power measurements at different levels of attenuations, which then determines whether an optical signal is suitable or not to be loaded. If the optical signal is suitable to be loaded, then a passband is opened in the WSS 50b to combine the optical signal into the second optical signal transmitted from the second WSS 50b towards the second optical fiber link 22b via a first destination port 52a. If the optical signal is not suitable to be loaded, then the passband for that optical signal is closed, thereby preventing the optical signal from being combined into the second optical signal transmitted from the second WSS 50b towards the second optical fiber link 22b.

In one implementation, each of optical splitter 66 splits a portion of an optical signal passing therethrough into an optical sample. In one implementation, the third network element 14c may further include the controller 80 in communication with one or more optical element of the MUX module 84, such as the second optical amplifier 58b, the second VOA 62b, the second photodetector 70b, the third photodetector 70c, the fourth photodetector 70d, and the second OPM 74b. The controller 80 may further comprise the controller processor 90 and the non-transitory computer readable medium referred to herein as the controller memory 94.

In some embodiment, the controller 80 may be integrated into the MUX module 84, however, in other embodiments, the controller 80 may be circuitry separate from, but in communication with, the MUX module 84.

In one implementation, the controller memory 94 of the third network element 14c may store a software application 98 that, when executed by the controller processor 90, causes the controller processor 90 to perform an action, such as, for example, communicate with, or control, e.g., via an electrical control signal, one or more optical element in the MUX module 84.

In one embodiment, the controller processor 90 is configured to communicate with one or more of the second optical amplifier 58b, the second variable optical attenuator 62b (second VOA 62b), the third optical splitter 66c, the fourth optical splitter 66d, the fifth optical splitter 66e, the sixth optical splitter 66f, the second photodetector 70b (second PD 70b), the third photodetector 70c, the fourth photodetector 70d, and the second optical performance monitor 74b (second OPM 74b).

In one implementation, the second WSS 50b is an N×2 WSS having two destination ports 52 (e.g., the first destination port 52a and a second destination port 52b). As shown in FIG. 2, the second WSS 50b is optically coupled to both the third optical splitter 66c via the first destination port 52a and to an optical switch 76 via the second destination port 52b, such that the second optical signal is supplied to both the third optical splitter 66c, as described above, and to the optical switch 76. The optical switch 76 is disposed between the fifth optical splitter 66e and the second OPM 74b and is configured to selectively supply the second optical signal to one of either the second OPM 74b or the fifth optical splitter 66e.

In one implementation, the second WSS 50b supplies the second optical signal via the first destination port 52a and an attenuated optical signal via the second destination port 52b. In this way, the second OPM 74b may validate the attenuated optical signal (as described below in detail) without interfering with the second optical signal, that is, without interfering with traffic passing through the third network element 14c from the first network element 14a.

Figure 3A:
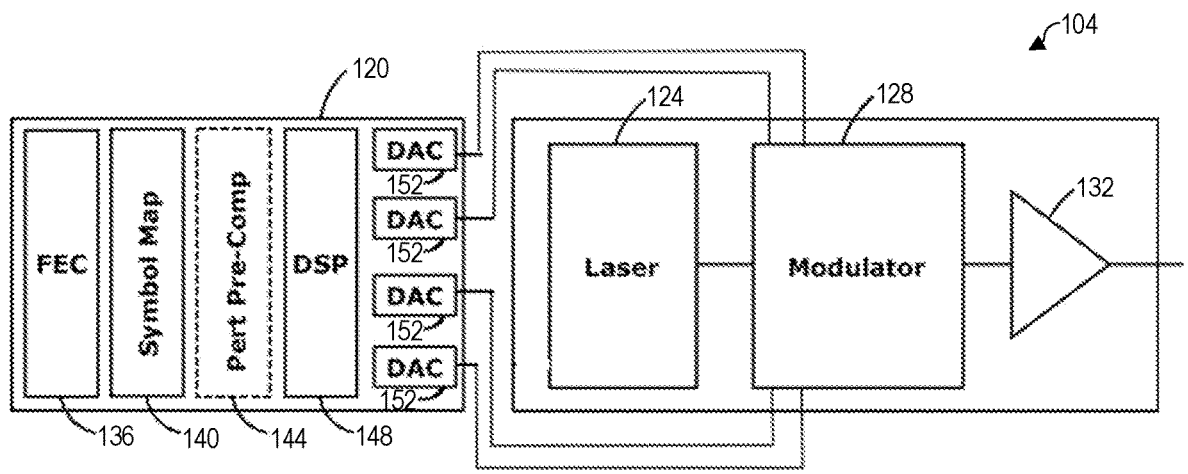
FIG. 3A is a diagram of an exemplary implementation of a light source of FIG. 2 constructed in accordance with the present disclosure.

Referring now to FIG. 3A, shown therein is a diagram of an exemplary implementation of the light source 104 of FIG. 2 constructed in accordance with the present disclosure. The light source 104 may comprise one or more transmitter processor circuit 120, one or more laser 124, one or more modulator 128, one or more semiconductor optical amplifier 132, and/or other components (not shown).

The transmitter processor circuit 120 may have a Transmitter Forward Error Correction (FEC) circuitry 136, a Symbol Map circuitry 140, a transmitter perturbative pre-compensation circuitry 144, one or more transmitter digital signal processor (DSP) 148, and one or more digital-to-analogue converters (DAC) 152. The transmitter processor circuit 120 may be located in any one or more components of the light source 104, or separate from the components, and/or in any location(s) among the components. The transmitter processor circuit 120 may be in the form of one or more Application Specific Integrated Circuit (ASIC), which may contain one or more module and/or custom module.

Processed electrical outputs from the transmitter processor circuit 120 may be supplied to the modulator 128 for encoding data into optical signals generated and supplied to the modulator 128 from the laser 124. The semiconductor optical amplifier 132 receives, amplifies, and transmits the optical signal including encoded data in the spectrum. Processed electrical outputs from the transmitter processor circuit 120 may be supplied to other circuitry in the transmitter processor circuit 120, for example, clock and data modification circuitry. The laser 124, modulator 128, and/or semiconductor optical amplifier 132 may be coupled with a tuning element (e.g., a heater) (not shown) that can be used to tune the wavelength of an optical signal channel output by the laser 124, modulator 128, or semiconductor optical amplifier 132. In some implementations, a single one of the laser 124 may be shared by multiple light source 104.

Other possible components in the light source 104 may include filters, circuit blocks, memory, such as non-transitory memory storing processor executable instructions, additional modulators, splitters, couplers, multiplexers, etc., as is well known in the art. The components may be combined, used, or not used, in multiple combinations or orders. Optical transmitters are further described in U.S. Patent Publication No. 2012/0082453, the content of which is hereby incorporated by reference in its entirety herein.

Figure 3B:
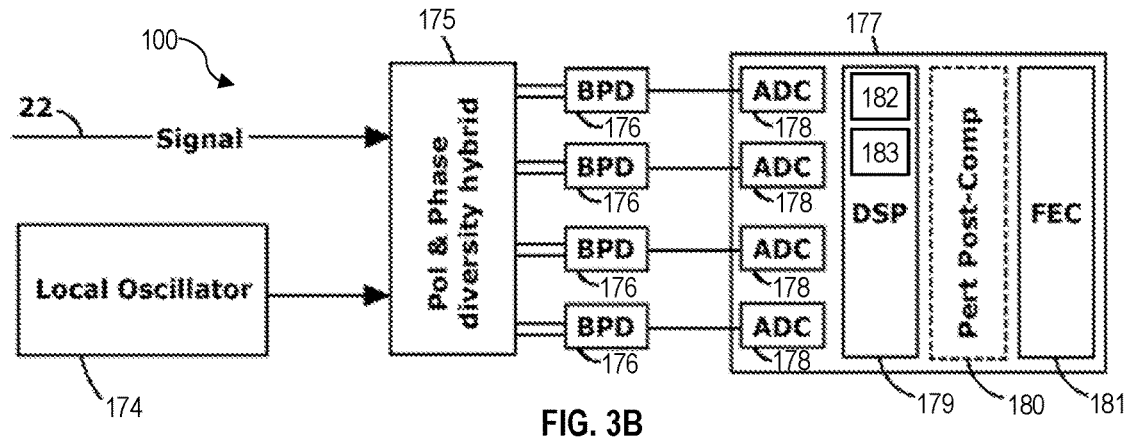
FIG. 3B is a block diagram of an exemplary implementation of a light sink constructed in accordance with the present disclosure.

Referring now to FIG. 3B, shown therein is a block diagram of an exemplary implementation of the light sink 100 constructed in accordance with the present disclosure. The light sink 100 may comprise one or more local oscillator 174, a polarization and phase diversity hybrid circuit 175 receiving the one or more channel from the optical signal and the input from the local oscillator 174, one or more balanced photodiode 176 that produces electrical signals representative of the one or more channel on the spectrum, and one or more receiver processor circuit 177. Other possible components in the light sink 100 may include filters, circuit blocks, memory, such as non-transitory processor-readable memory storing processor-executable instructions, additional modulators, splitters, couplers, multiplexers, etc., as is well known in the art. The components may be combined, used, or not used, in multiple combinations or orders. The light sink 100 may be implemented in other ways, as is well known in the art. Exemplary implementations of the light sink 100 are further described in U.S. patent application Ser. No. 12/052,541, titled "Coherent Optical Receiver", the entire contents of which are hereby incorporated by reference.

The one or more receiver processor circuit 177, may comprise one or more analog-to-digital converter (ADC) 178 receiving the electrical signals from the balanced photodiodes 176, one or more receiver digital signal processor (hereinafter, receiver DSP 179), receiver perturbative post-compensation circuitry 180, and receiver forward error correction circuitry (hereinafter, receiver FEC circuitry 181). The receiver FEC circuitry 181 may apply corrections to the data, as is well known in the art. The one or more receiver processor circuit 177 and/or the one or more receiver DSP 179 may be located on one or more component of the light sink 100 or separately from the components, and/or in any location(s) among the components. The receiver processor circuit 177 may be in the form of an Application Specific Integrated Circuit (ASIC), which may contain one or more module and/or custom module. In one embodiment, the receiver DSP 179 may include, or be in communication with, one or more processor 182 and one or more memory 183 storing processor readable instructions, such as software, or may be in communication with the controller processor 90 and the controller memory 94.

The one or more receiver DSP 179 may receive and process the electrical signals with multi-input-multiple-output (MIMO) circuitry, as described, for example, in U.S. Pat. No. 8,014,686, titled "Polarization demultiplexing optical receiver using polarization oversampling and electronic polarization tracking", the entire contents of which are hereby incorporated by reference herein. Processed electrical outputs from receiver DSP 179 may be supplied to other circuitry in the receiver processor circuit 177, such as the receiver perturbative post-compensation circuitry 180 and the receiver FEC circuitry 181.

Various components of the light sink 100 may be provided or integrated, in one example, on a common substrate.

Further integration is achieved by incorporating various optical demultiplexer designs that are relatively compact and conserve space on the surface of the substrate.

In use, the one or more channel of the spectrum may be subjected to optical non-linear effects between the light source 104 and the light sink 100 such that the spectrum received does not accurately convey carried data in the form that the spectrum was transmitted.

Figures 4A, 4B, 4C, 4D:
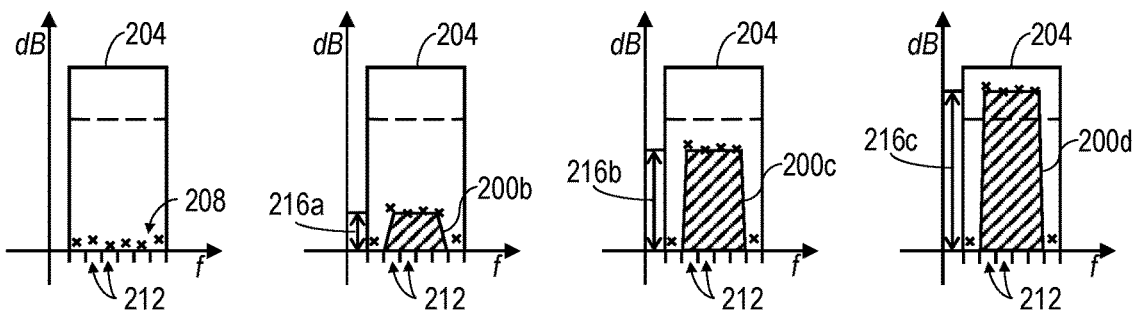
FIGS. 4A-D are diagrams of exemplary implementations of optical signals at varying attenuations in accordance with the present disclosure.

Referring now to FIGS. 4A-D in combination, shown therein are diagrams of exemplary embodiments of optical signals 200a-d at varying attenuations. Generally, FIG. 4A shows an optical spectrum 204 having a first attenuated optical signal 200a only including a noise floor 208 when the second WSS 50b is at maximum attenuation for the optical spectrum 204, i.e., the second WSS 50b is blocking the first attenuated optical signal 200a, within the optical spectrum 204 (other than the noise floor 208). The first attenuated optical signal 200a within the optical spectrum 204 may be considered an unallocated stage when the second WSS 50b is fully attenuated within the optical spectrum 204. FIGS. 4B-D show the optical spectrum 204 during a period of time when the optical signal is being 'muxed' with varying (e.g., increasing) attenuations passing through the second WSS 50b. A portion of the attenuated optical signals 200b, 200c and 200d in FIGS. 4B-D are being passed through the second WSS 50b at different instances of time, and combined with one or more other optical signal to form the second optical signal transmitted from the second WSS 50b towards the second optical fiber link 22b.

Shown in FIG. 4A, at a first instant in time, the second WSS 50b is fully attenuated for the optical spectrum 204, resulting in an optical signal within the optical spectrum 204 present at an input of the second WSS 50b not being present in the first attenuated optical signal 200a in the optical spectrum 204. However, power measurement of the optical signal (i.e., by the second OPM 74b) within the optical spectrum 204 may have inherent noise associated with the power measurement, which is referred to as the noise floor 208. The noise floor may also include spectral content from external sources due to finite filtering of the WSS 50b (e.g., due to filtering limitations of the WSS 50b). The noise floor 208 is determined for each slice 212 within the optical spectrum 204. 6 slices 212 within the optical spectrum 204 are shown by way of example. It should be understood that the number of slices 212 shown in FIGS. 4A-D is exemplary and that the number of slices 212 in the optical spectrum 204 may be determined based on the resolution of the OPM. For example, if the second OPM 74b has a resolution of 12.5 GHz and the optical spectrum has a bandwidth of 4.8 THz, there may be 384 slices 212, each slice 212 having a 12.5 GHz width. As another example, if the second OPM 74b has a resolution of 3.125 GHz and the optical spectrum has a bandwidth of 4.8 THz, there may be 1536 slices 212, each slice 212 having a 3.125 GHz width. In one implementation, the noise floor 208 is determined on a slice-by-slice basis before a passband is activated by the second WSS 50b. The noise floor 208 may be considered a baseline for peak-to-floor measurements as detailed below.

Shown in FIG. 4B, at a second instant in time, the second WSS 50b applies a first attenuation to the optical signal resulting in a second attenuated optical signal 200b at a first power. When the second attenuated optical signal 200b is attenuated to the first power, a first output power 216a for each slice may be determined by the second OPM 74b. A first peak-to-floor ratio (first PFR) may be determined for each slice of the optical spectrum 204. The first PFR may be determined by dividing the first output power 216a for a particular slice by the noise floor 208 for that particular slice. In one embodiment, the first PFR is determined with the following PRF formula:

$$PFR_{Slice[j]} = \frac{P_{Slice\ Signal\ Power(mw)[j]}}{P_{Slice\ Noise\ Floor(mw)[j]}}; PFR\ \text{Formula}$$

Shown in FIG. 4C, at a third instant in time, the second WSS 50b applies a second attenuation to the optical signal resulting in a third attenuated optical signal 200c at a second power. When the third attenuated optical signal 200c is attenuated to the second power, a second output power 216b for each slice may be determined by the second OPM 74b. A second peak-to-floor ratio (second PFR) may be determined for each slice of the optical spectrum 204. The second PFR may be determined by dividing the second output power 216b for a particular slice by the noise floor 208 for that particular slice as provided for in the PFR Formula above. In one implementation, the second attenuation is less than the first attenuation.

Shown in FIG. 4D, at a fourth instant in time, the second WSS 50b applies a third attenuation to the optical signal resulting in a fourth attenuated optical signal 200d at a third power. When the fourth attenuated optical signal 200d is attenuated to the third power, a third output power 216c for each slice 212 may be determined by the second OPM 74b. A third peak-to-floor ratio (third PFR) may be determined for each slice 212 of the optical spectrum 204. The third PFR may be determined by dividing the third output power 216c for a particular slice by the noise floor 208 for that particular slice as provided for in the PFR Formula above. In one implementation, the third attenuation is less than the second attenuation.

In one implementation, the first, second, third, and fourth attenuated optical signals 200a-d may not occupy the entirety of the optical spectrum 204 and/or PFR measurements may be affected by cross-talk from neighboring channels. Therefore, a sensing range may be defined to ensure that the PFR is calculated within the optical spectrum 204 without interference from cross-talk from neighboring channels.

Figure 5:
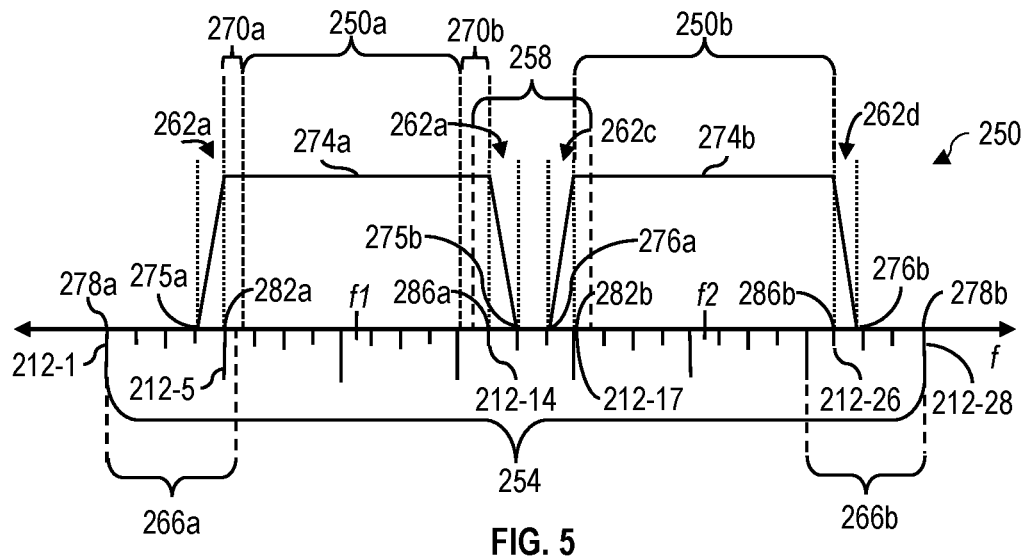
FIG. 5 is a diagram of an exemplary embodiment of a passband constructed in accordance with the present disclosure.

Referring now to FIG. 5, shown therein is a diagram of an exemplary embodiment of a passband 254 constructed in accordance with the present disclosure. One or more guard band may be implemented to determine a sensing range 250 of each optical channel 274 (e.g., activated channel or activated optical channel) of the passband 254. The one or more guard band may include, for example, one or more of a channel guard band 258, a channel roll-off guard band 262, a wavelength selective switch guard band 266 (WSS guard band 266), and/or a single channel uncertainty guard band 270. In some implementations, additional guard bands, such as a frequency offset guard band, may be measured and/or accounted for, as described below.

In one implementation, the sensing range 250 of each optical channel 274 (shown in FIG. 5 as a first sensing range 250a and a second sensing range 250b) may be a set of PFRs for each optical channel 274 of the passband 254. Generally, the sensing range may be a subset of the set of PFRs selected to account for cross-talk, guard bands, roll-offs, and/or the like, which may distort a power level measurement.

In one implementation, the channel guard band 258 accounts for a minimum spacing between two adjacent ones of the optical channels 274, shown in FIG. 5 as a first optical channel 274a and a second optical channel 274b. Each optical channel 274 further includes a first channel edge and a second channel edge. For example, the first optical channel 274a includes a first channel edge 275a and a second channel edge 275b, while the second optical channel 274b includes a first channel edge 276a and a second channel edge 276b. The channel guard band 258 may have a bandwidth centered on a channel band frequency. The bandwidth of the channel guard band 258 may be predetermined and stored in the controller memory 94, for example.

In one embodiment, the channel roll-off guard band 262, may include a first channel roll-off guard band 262a and a second channel roll-off guard band 262b for each optical channel 274 in the passband 254. For example, as shown in FIG. 5, a first optical channel 274a may have a first channel roll-off guard band 262a and a second channel roll-off guard band 262b, and a second channel 247b may have a third channel roll-off guard band 262c and a fourth channel roll-off guard band 262d. The channel roll-off guard band 262 accounts for one edge roll-off of a particular channel of the optical spectrum. Each channel roll-off guard band 262 may be a bandwidth centered on a roll-off band frequency. The bandwidth of the channel roll-off guard band 262 may be predetermined and stored in the controller memory 94, for example.

In one implementation, the WSS guard band 266 includes a first WSS guard band 266a at a first edge 278a (e.g., frequency) of the passband 254 and a second WSS guard band 266b as a second edge 278b of the passband 254. The WSS guard band 266 accounts for WSS cross-talk by defining a minimum distance between the one or more optical channel 274 and the first edge 278a of the passband 254 and the second edge 278b of the passband 254. Each WSS guard band 266 may be a bandwidth centered on a WSS band frequency. The bandwidth of the WSS guard band 266 may be predetermined and stored in the controller memory 94, for example.

In one implementation, the single channel uncertainty guard band 270 accounts for frequency and/or OPM 74 measurement uncertainty for each optical channel 274 in the passband 254. As shown in FIG. 5, the single channel uncertainty guard band 270 may be a first single channel uncertainty guard band 270a and a second single channel uncertainty guard band 270b. The first single channel uncertainty guard band 270a and the second single channel uncertainty guard band 270b account for frequency errors in one or more frequency measurement performed by the second OPM 74b and/or frequency drift of a center frequency the first optical channel 274a from a frequency center f1. In some implementations, the single channel uncertainty guard band 270 may also be associated with the second optical channel 274b, however, for simplicity, the single channel uncertainty guard band 270 is only shown for the first optical channel 274a.

In one implementation, the sensing range 250 of a particular one of the optical channel 274 is defined by a start frequency 282 and an end frequency 286. For example, a first sensing range 250a of the first optical channel 274a if defined by a first start frequency 282a and a first end frequency 286a. The first start frequency 282a may be determined, for example, by the following Fstart Formula:

$$F_{SR\_start} = \max(F_{C\_end\_closest\_left} + F_{Carrier\ Guardband},$$
$$F_{WSS\_start} + F_{WSS\ Guardband}, F_{C\_start} +$$
$$F_{Carrier\_rolloff} + F_{Single\ Carrier\ uncertainty}); \text{Fstart Formula}$$

Where $F_{C\_end\_closest\_left}$ is an end frequency of the closest left channel to the channel being measured (i.e., the second channel edge 275b for the second sensing range 250b); $F_{Carrier\ Guardband}$ is a bandwidth of the carrier guard band 258; $F_{WSS\_start}$ is a start frequency of the passband 250 (i.e., the edge 278a); $F_{WSS\ Guardband}$ is a bandwidth of the WSS guard band 266; $F_{C\_start}$ is the first channel edge 275a; $F_{Carrier\_rolloff}$ is a bandwidth of the channel roll-off guard band 262; and $F_{Single\ Carrier\ uncertainty}$ is a bandwidth of the uncertainty guard band 270.

The first end frequency 286a may be determined, for example, by the following Fend Formula:

$$F_{SR\_end} = \min(F_{C\_start\_closest\_right} - F_{Carrier\ guardband},$$
$$F_{WSS\_end} - F_{WSS\ Guardband}, F_{C\_end} - F_{Carrier\_rolloff} -$$
$$F_{Single\ Carrier\ uncertainty}); \text{Fend Formula}$$

Where $F_{C\_start\_closest\_right}$ is an end frequency of the closest right channel to the channel being measured (e.g., the first channel edge 276a); $F_{WSS\_end}$ is an end frequency of the passband 250 (i.e., the second edge 278b); $F_{C\_end}$ is the second channel edge 276b.

The second sensing range 250b may be calculated in a similar manner as the first sensing range 250a to determine a second start frequency 282b and a second end frequency 286b.

In one implementation, once the sensing range 250 for each channel has been determined, the start frequency 282 and the end frequency 286 are rounded (either up or down) to the nearest slice 212. For example, the first start frequency 282a may be rounded to slice 212-5 and the first end frequency 286a may be rounded to the slice 212-14 while the second start frequency 282b may be rounded to the slice 212-17 and the second end frequency 286b may be rounded to the slice 212-26.

The sensing range 250 may be used to determine the PFR for the passband 254. For example, an average PFR may be calculated with the following:

$$PFR_{avg} = \frac{1}{N}\sum_{i=1}^{N} PFR[i];$$

Where N is the total number of slices 212 in the sensing range 250 and i, indicates a particular slice 212 of the passband 254.

In other implementations, the sensing range 250 may be used to determine a minimum PFR with the following:

$$PFR_{min} = \min_{i \in 1:N}(PFR[i]);$$

Figure 6:
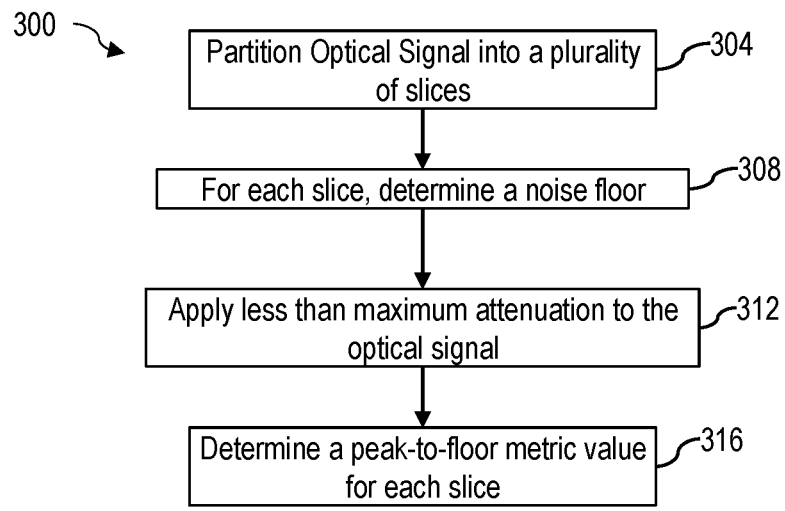
FIG. 6 is a process flow diagram of an exemplary embodiment of an attenuation reduction process constructed in accordance with the present disclosure.

Referring now to FIG. 6, shown therein is a process flow diagram of an exemplary embodiment of an attenuation reduction process 300 constructed in accordance with the present disclosure. The attenuation reduction process 300 generally comprises the steps of: partitioning an optical signal into a plurality of slices (step 304); determining a noise floor (step 308); applying less than maximum attenuation to the optical signal (step 312); and calculating a peak-to-floor metric value (316). In one implementation, the attenuation reduction process 300 is stored as a series of processor-executable instructions in the controller memory 94 and is executed by the controller processor 90.

In one embodiment, partitioning an optical signal into a plurality of slices (step 304) includes receiving, by the second OPM 74b, a sample optical signal. The second OPM 74b may be configured with a slice resolution, for example, of 12.5 gigahertz ("GHz"), 6.25 GHz, and/or 3.125 GHz, resulting in a plurality of slices 212 sized based on the slice resolution of the second OPM 74b. In one embodiment, the second OPM 74b may be a coherent OPM. In one implementation, the sample optical signal may be selected from a group consisting of a particular optical signal of the first optical signals and a portion of the second optical signal including the particular optical signal. For example, the sample optical signal may be received either from the portion of the second optical signal directed by the fourth optical splitter 66d and/or an optical signal received via the second destination port 52b.

In one embodiment, determining a noise floor (step 308) includes causing, e.g., by the controller processor 90, the second WSS 50b to fully attenuate a particular incoming optical signal and detecting, by the second OPM 74b, an output power as the noise floor. In one implementation, determining the noise floor is performed for each slice 212 of the plurality of slices 212. The noise floor for each of the plurality of slices 212 may be measured as a power, e.g., mW, and, in some implementations, may be stored in the controller memory 94.

In one embodiment, applying less than maximum attenuation to the optical signal (step 312) includes providing a fraction of the maximum attenuation to the particular incoming optical signal and detecting, by the second OPM 74b, an attenuated power for each of the plurality of slices 212. For example, ⅓ of the maximum attenuation may be applied to the particular incoming optical signal and the second OPM 74b may measure an attenuated power for each slice 212 of the particular incoming optical signal. In one embodiment, the controller processor 90 may receive the measured attenuated power value from the second OPM 74b and store that attenuated power value in the controller memory 94.

In one embodiment, calculating a peak-to-floor metric value (316) includes computing a peak-to-floor metric value for each of the plurality of slices 212 based as least in part on the measured attenuated power of that particular slice 212. The peak-to-floor metric may be one or more of a peak-to-floor ratio (PFR), an average PFR (i.e., average peak-to-floor ratio), and/or a minimum PFR (i.e., minimum peak-to-floor ratio).

In one embodiment, the PFR is determined by calculating the ratio of the measured attenuated power divided by the noise floor for each slice 212 of the plurality of slices 212. In some implementations, the controller processor 90 may retrieve the measured attenuation power value and the noise floor for each slice 212 of the plurality of slices 212 in order to calculate the PFR.

In one implementation, once the PFR for each slice 212 of the plurality of slices 212 is determined, the controller processor 90 may calculate an average PFR for the particular incoming optical signal. For example, the controller processor 90 may calculate the PFR as described above, calculate a sum of the PFRs divided by the number of slices 212 in the plurality of slices 212.

In one implementation, the average PFR is calculated only for slices 212 of the particular incoming optical signal having an activated optical channel. For example, if the particular incoming optical signal comprises 16 slices 212 and of those slices 212, the activated optical channel is active on 8 slices 212 (e.g., activated slices 212), then the average PFR is calculated across the 8 activated slices 212.

In one embodiment, calculating a peak-to-floor metric value (316) includes determining a plurality of activated slices within a sensing range 250 of the plurality of slices 212 and computing a peak-to-floor metric value for each of the plurality of activated slices 212. The sensing range 250 may be a first sensing range 250a defined by a first start frequency 282a rounded down to the nearest slice frequency and a first end frequency 286a rounded up to the nearest slice frequency. The first start frequency 282a may be determined by finding a maximum frequency of a $F_{C\_end\_closest\_left} + F_{Carrier\ Guardband}$; $F_{WSS\_start} + F_{WSS\ Guardband}$; and $F_{C\_start} + F_{Carrier\_rolloff} + F_{Single\ Carrier\ uncertainty}$, as detailed above. Similarly, the first end frequency 286a may be determined by finding a minimum frequency of $F_{C\_start\_closest\_right} - F_{Carrier_{guardband}}$; $F_{WSS_{end}} - F_{WSS\ Guardband}$; and $F_{C\_end} - F_{Carrier\_rolloff} - F_{Single\ Carrier\ uncertainty}$, as detailed above.

In one implementation, once the PFR for each slice 212 of the plurality of slices 212 is determined, the controller processor 90 may calculate a minimum PFR for the particular incoming optical signal. For example, the controller processor 90 may calculate the PFR as described above, and determine a minimum PFR of the calculated PFR for each slice 212 of the plurality of slices 212. Additionally, in one implementation, the minimum PFR is calculated only for slices 212 of the particular incoming optical signal having an activated optical channel. For example, if the particular incoming optical signal comprises 16 slices 212 and, of those slices 212, the activated optical channel is active on 8 slices 212 (e.g., activated slices 212), then the minimum PFR is calculated of the 8 activated slices 212, e.g., the activated slices 212 in the sensing range.

In one implementation, applying less than maximum attenuation to the optical signal (step 312) and calculating a peak-to-floor metric value (316) may be performed more than one time. With step 312 and step 316 are performed more than once, the applied attenuation may be changed for each performance, such that, for example, if step 312 and step 316 are performed three times, step 312 and step 316 are performed with a first attenuation at a first instant in time, step 312 and step 316 are performed with a second attenuation at a second instant in time where the second attenuation is less than the first attenuation, and step 312 and step 316 are performed with a third attenuation at a third instant in time where the third attenuation is less than the second attenuation. While in this implementation the applied attenuation is decreased for each iteration, in other implementations, alternative applied attenuations may be used. In one implementation, applying less than maximum attenuation to the optical signal (step 312) and calculating a peak-to-floor metric value (316) may take between 0.5 seconds and 4 seconds to perform for each attenuation at each instant of time.

In one embodiment, calculating a peak-to-floor metric value (316) includes providing the attenuated optical signal to the second destination port 52b and determining a plurality of activated slices within a sensing range 250 of the plurality of slices 212 of the attenuated optical signal, e.g., by the second OPM 74b, and computing a peak-to-floor metric value for each of the plurality of activated slices 212. In this implementation, the second OPM 74b may be a coherent OPM.

Figure 7:
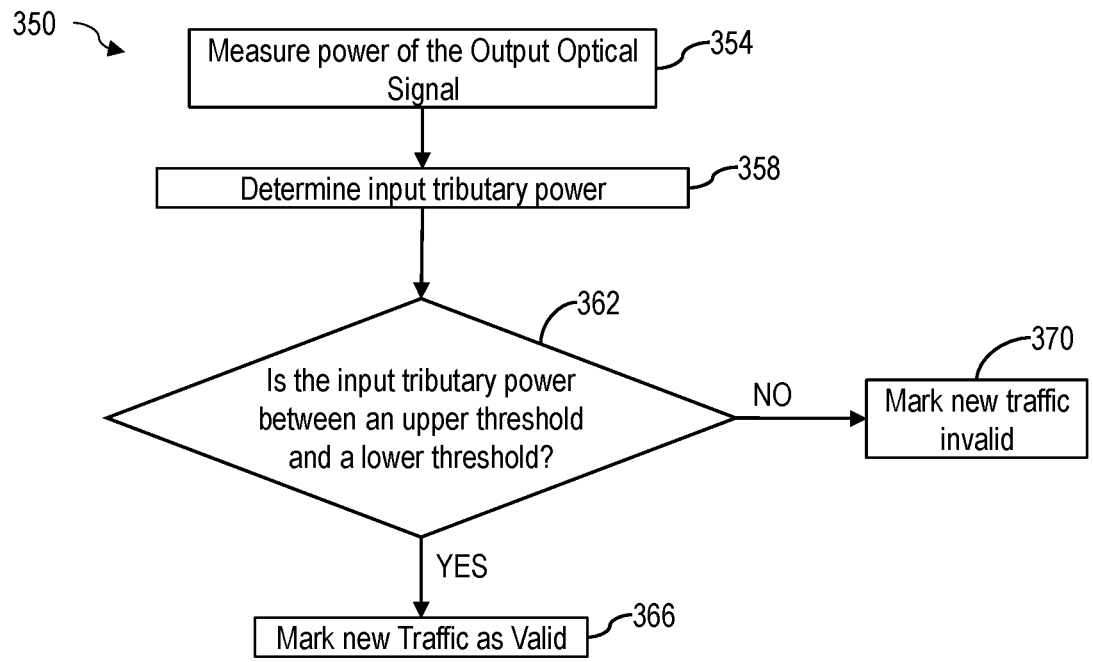
FIG. 7 is a process flow diagram of an exemplary embodiment of a tributary validation process constructed in accordance with the present disclosure.

Referring now to FIG. 7, shown therein is a process flow diagram of an exemplary embodiment of a tributary validation process 350 constructed in accordance with the present disclosure. Generally, the tributary validation process 350 comprises: measuring the power of the output optical signal (step 354); determining an input tributary power (step 358); if the input tributary power is between an upper power threshold and a lower power threshold (step 362), then mark the input optical signal as valid (step 366); otherwise mark the input optical signal as invalid (step 370).

In one implementation, measuring the power of the output optical signal (step 354) includes measuring an output power of the second optical signal by the second OPM 74b, and storing, e.g., by the controller processor 90, the measured output power in the controller memory 94.

In one implementation, determining an input tributary power (step 358) includes estimating the input tributary power by summing the power measured by the second OPM 74b with a gain from the second optical amplifier 58b and subtracting the insertion losses. In one implementation, the input tributary power ($P_{sig\_in\_dBm}$) may be estimated using the formula:

$$P_{sig\_in\_dBm} = P_{sig\_OPM\_dBm} + IL_{OPM\_dB} - G_{EDFA\_dB} + IL_{WSS};$$

Where $P_{sig\_OPM\_dBm}$ is the power of the output optical signal as measured by the second OPM 74b; $G_{EDFA\_dB}$ is the gain supplied by the second optical amplifier 58b; $IL_{OPM\_dB}$ is the insertion loss between the second WSS 50b and the second OPM 74b; and $IL_{WSS}$ is the insertion loss across the second WSS 50b between the first optical signal and the second optical signal. In one implementation, the $IL_{WSS}$ May be Frequency Dependent, that is, the Insertion Loss due to the second WSS 50b may be dependent on the bandwidth or frequencies of the first optical signal and/or the second optical signal.

In one implementation, determining an input tributary power (step 358) includes determining the input tributary power for each slice 212 of the first optical signal. In other implementations, determining the input tributary power (step 358) is only performed for the activated slices 212, e.g., slices 212 of the plurality of slices 212 in the sensing range 250 as determined above.

In one implementation, determining if the input tributary power is between an upper power threshold and a lower power threshold (step 362) includes comparing the estimated input tributary power to one or more of the upper power threshold and the lower power threshold. In one embodiment, the upper power threshold and/or the lower power threshold may be predetermined and stored in the controller memory 94. In one implementation, the lower power threshold and the upper power threshold may be defined as a percentage from a target power level.

Figure 8:
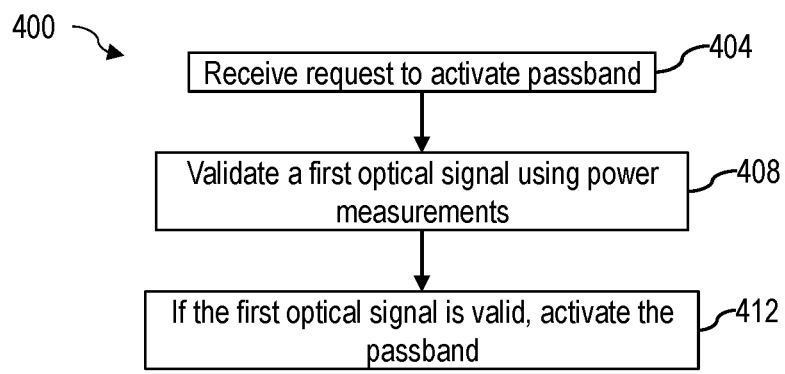
FIG. 8 is a process flow diagram of an exemplary embodiment of a traffic validation process constructed in accordance with the present disclosure.

Referring now to FIG. 8, shown therein is a process flow diagram of an exemplary embodiment of a traffic validation process 400 constructed in accordance with the present disclosure. Generally, the traffic validation process 400 comprises the steps of: receiving a request to activate a passband (step 404); validating the passband for activation (step 408); and, if the passband is valid, activating the passband (step 412).

In one implementation, receiving a request to activate a passband (step 404) comprises receiving a request to activate one or more channel and/or carrier on the passband. In some embodiments, step 404 may occur after step 408. Specifically, in some embodiments, a particular optical signal can be passed from an ADD port (e.g., port 51c) to the second destination port 52B, as shown in FIG. 2. In this embodiment, the request to activate the passband (step 404) may occur after the particular optical signal (e.g., first optical signal) is validated at step 408.

In one implementation, receiving a request to activate a passband (step 404) comprises receiving, by the controller processor 90, a request to activate one or more channel on the optical spectrum. The one or more channel to activate may be received, for example, by the light source 104.

In one implementation, receiving a request to activate a passband (step 404) comprises receiving, by the controller processor 90, a request to multiplex a particular one or more passband onto the optical spectrum. The one or more particular passband to multiplex may be received, for example, via the one or more source ports 51.

In one implementation, validating the passband for activation (step 408) comprises validating each channel and/or carrier on the passband, and, if any channel and/or carrier fails to validate, the passband fails to validate.

In one implementation, validating the passband for activation (step 408) comprises performing, e.g., by the controller processor 90, the attenuation reduction process 300 described above. The PFR for each slice 212 may then be compared against a predetermined ratio threshold for each slice 212 to determine whether the passband is valid. For example, the predetermined ratio threshold may be a maximum ratio threshold such that if the PFR for any slice 212 exceeds the predetermined ratio threshold, the passband is considered invalid. In another example, the predetermined ratio threshold may be a minimum ratio threshold such that if the PFR for any slice 212 is below the predetermined ratio threshold, the passband is considered invalid. In yet another example, the predetermined ratio threshold may be a maximum ratio threshold and a minimum ratio threshold such that if the PFR for any slice 212 exceeds the maximum ratio threshold or falls below the minimum ratio threshold, the passband is considered invalid.

In one implementation, validating the passband for activation (step 408) may further comprise performing the tributary validation process 350 described above. For example, validating the passband for activation (step 408) may further comprise determining one or more of the average PFR and/or the minimum PFR. The average PFR and/or the minimum PFR may be determined for each slice 212 in the passband. In one implementation, the average PFR and/or the minimum PFR may be determined for each slice 212 of the passband in the sensing range 250, as described above.

In one implementation, validating the passband for activation (step 408) includes comparing the average PFR to an average ratio threshold. For example, the average ratio threshold may be a maximum average threshold such that if the average PFR exceeds the average ratio threshold, the passband is considered invalid. In another example, the average ratio threshold may be a minimum average threshold such that if the average PFR is below the average ratio threshold, the passband is considered invalid. In yet another example, the average ratio threshold may be a maximum average threshold and a minimum average threshold such that if the average PFR for any slice 212 exceeds the maximum average threshold or falls below the minimum average threshold, the passband is considered invalid.

In one implementation, validating the passband for activation (step 408) includes comparing the minimum PFR to a predetermined minimum threshold. For example, the PFR for each slice 212 of the passband may be compared to the predetermined minimum threshold and, if the PFR for any slice 212 falls below the predetermined minimum threshold, the passband may be considered invalid.

In one implementation, validating the passband for activation (step 408) includes both performing, e.g., by the controller processor 90, the attenuation reduction process 300 and the tributary validation process 350.

In one implementation, validating the passband for activation (step 408) includes comparing one or more of the power of the second optical signal as measured by the second OPM 74b, the power of each slice 212 of the sensing range 250, the PFR for one or more slice 212 of the sensing range 250, and/or the like, to provisioning information for each channel of the second optical channel.

In one implementation, validating the passband for activation (step 408) comprises determining whether the particular optical signal's OPM measurement is valid based on the PFR and the predetermined ratio threshold. For example, the particular optical signal's OPM measurement may include on or more measured optical characteristics (e.g., optical characteristics discussed above), either for each channel in the particular optical signal, or for the particular optical signal as a whole. The one or more measured optical characteristics may be compared against a one or more expected optical characteristics to determine whether the particular optical signal's OPM measurement is valid.

In one implementation, validating the passband for activation (step 408) comprises determining whether the particular optical signal's OPM measurement is valid and then performing the tributary validation process 350 to validate the passband for activation.

In one implementation, if the passband is valid, activating the passband (step 412) may include multiplexing, e.g., by the second WSS 50b, the passband into the optical signal.

In one implementation, if the passband is considered invalid, or is not considered valid, the controller processor 90 may cause the second WSS 50b to prevent the passband from being multiplexed into the optical signal, thereby preventing inclusion of any SRS tilt, power transients, and/or other penalties within the second optical signal due to the invalid passband. However, in other implementations, the controller processor 90 may cause the second WSS 50b to insert, i.e., multiplex ASE or other light into the optical signal with a bandwidth similar to the passband.

From the above description, it is clear that the inventive concept(s) disclosed herein are well adapted to carry out the objects and to attain the advantages mentioned herein, as well as those inherent in the inventive concept(s) disclosed herein. While the implementation s of the inventive concept(s) disclosed herein have been described for purposes of this disclosure, it will be understood that numerous changes may be made and readily suggested to those skilled in the art which are accomplished within the scope and spirit of the inventive concept(s) disclosed herein.

What is claimed is:

1. A multiplexer module, comprising:
   a wavelength selective switch configured to receive a plurality of first optical signals within a plurality of passbands, selectively multiplex the first optical signals within the plurality of passbands into a second optical signal, and output the second optical signal;
   an optical performance monitor operable to receive a sample optical signal and determine a power of one or more slice within the sample optical signal, the sample optical signal being selected from a group consisting of a particular optical signal of the first optical signals and a portion of the second optical signal including the particular optical signal;
   a controller processor; and
   a controller memory, the controller memory being a non-transitory processor-readable memory storing processor-executable instructions, that when executed by the controller processor, cause the controller processor to:
      validate the particular optical signal of the plurality of first optical signals using the power of one or more slice within the sample optical signal; and
      if the particular optical signal of the plurality of first optical signals is valid, cause the wavelength selective switch to open a particular passband so as to multiplex the particular one of the plurality of first optical signals into the second optical signal,
   wherein the controller memory further includes processor executable instructions that when executed by the controller processor further cause the controller processor to:
      control the wavelength selective switch to selectively apply a first attenuation to the particular optical signal of the plurality of first optical signals;
      detect a first power of the particular optical signal from the optical performance monitor;
      control the wavelength selective switch to selectively apply a second attenuation to the particular optical signal, the second attenuation being less than the first attenuation;
      detect a second power of the particular optical signal from the optical performance monitor; and
      calculate a peak-to-floor ratio for the particular optical signal based at least in part on the first power and the second power.

2. The multiplexer module of claim 1, wherein particular optical signal includes channels of interest, and wherein the first attenuation is a sufficient to suppress the channels of interest.

3. The multiplexer module of claim 1, wherein the controller memory further includes processor executable instructions that when executed by the controller processor further cause the controller processor to:
   discretize the particular optical signal into a plurality of slices; and
   wherein detecting the first power of the particular optical signal from the optical performance monitor includes detecting, by the optical performance monitor, a first power of each slice of the plurality of slices; detecting a second power of the particular optical signal further includes detecting, by the optical performance monitor, a second power of each slice of the plurality of slices; and wherein calculating the peak-to-floor ratio further includes calculating the peak-to-floor ratio for each slice of the plurality of slices.

4. The multiplexer module of claim 3, wherein the controller memory further includes processor executable instructions that when executed by the controller processor further cause the controller processor to:
   determine that the particular optical signal is valid based on the peak-to-floor ratio and a predetermined ratio threshold.

5. The multiplexer module of claim 4, wherein the predetermined ratio threshold is one or more of a maximum ratio threshold and a minimum ratio threshold; and wherein determining that the particular optical signal is valid includes determining that the particular optical signal is valid when the peak-to-floor ratio is below the maximum ratio threshold and above the minimum ratio threshold.

6. The multiplexer module of claim 3, wherein the controller memory further includes processor executable instructions that when executed by the controller processor further cause the controller processor to:
   calculate an average peak-to-floor ratio of the calculated peak-to-floor ratio of each slice of the plurality of slices; and
   determine that the particular optical signal is valid based on the average peak-to-floor ratio and an average ratio threshold.

7. The multiplexer module of claim 3, wherein the controller memory further includes processor executable instructions that when executed by the controller processor further cause the controller processor to:
   calculate a minimum peak-to-floor ratio of the calculated peak-to-floor ratios of each slice of the plurality of slices; and
   determine that the particular optical signal is valid if the minimum peak-to-floor ratio is above a minimum ratio threshold.

8. The multiplexer module of claim 3, wherein the controller memory further includes processor executable instructions that when executed by the controller processor further cause the controller processor to:
   determine a sensing range of the particular optical signal, the sensing range being one or more bandwidth of the particular optical signal having one or more activated channel outside of a guard band; and
   wherein discretizing the particular optical signal includes discretizing the sensing range into the plurality of slices.

9. The multiplexer module of claim 8, wherein the guard band is one or more of a channel guard band, channel roll-off guard band, wavelength selective switch guard band, single channel uncertainty guard band, and frequency offset guard band.

10. The multiplexer module of claim 1, wherein the wavelength selective switch is further configured to receive the plurality of first optical signals from one or more of an express path, an add port, a light source supplying data traffic, and a light source supplying amplified spontaneous emission light.

11. A method, comprising:
    receiving, by a wavelength selective switch, a plurality of first optical signals, the wavelength selective switch being operable to selectively output a second optical signal comprising one or more passband of the plurality of first optical signals;
    validating a particular optical signal of the plurality of first optical signals based at least in part on a power measured by an optical performance monitor;
    if the particular optical signal is validated, multiplexing, by the wavelength selective switch, the particular optical signal of the plurality of first optical signals into the second optical signal;
    selectively applying a first attenuation to the particular optical signal of the plurality of first optical signals;
    detecting a first power of the particular optical signal from the optical performance monitor;
    controlling the wavelength selective switch to selectively apply a second attenuation to the particular optical signal, the second attenuation being less than the first attenuation;
    detecting a second power of the particular optical signal from the optical performance monitor; and
    calculating a peak-to-floor ratio for the particular optical signal based at least in part on the first power and the second power.

12. The method of claim 11, wherein selectively applying the first attenuation comprises selectively applying, by the wavelength selective switch, the first attenuation sufficient to suppress the particular optical signal.

13. The method of claim 11, further comprising:
    discretizing the particular optical signal into a plurality of slices; and
    wherein detecting the first power of the particular optical signal from the optical performance monitor includes detecting, by the optical performance monitor, a first power of each slice of the plurality of slices; detecting a second power of the passband further includes detecting, by the optical performance monitor, a second power of each slice of the plurality of slices; and wherein calculating the peak-to-floor ratio further includes calculating the peak-to-floor ratio for each slice of the plurality of slices.

14. The method of claim 13, further comprising:
    determining the particular optical signal's optical performance monitor measurement is valid based on the peak-to-floor ratio and a predetermined ratio threshold.

15. The method of claim 14, further comprising determining the validity of the particular optical signal based upon optical characteristics of the particular optical signal measured by the optical performance monitor.

16. The method of claim 15, wherein the optical characteristics are selected from a group consisting of power profile, power spectral density, center frequency, average peak-to-floor ratio and an average ratio threshold.

17. The method of claim 16, wherein the predetermined ratio threshold is one or more of a maximum ratio threshold and a minimum ratio threshold; and wherein determining the particular optical signal is valid includes determining that the particular optical signal is valid when the peak-to-floor ratio is below the maximum ratio threshold and above the minimum ratio threshold.

18. The method of claim 13, further comprising:
    calculating an average peak-to-floor ratio of the calculated peak-to-floor ratio for each slice of the plurality of slices; and
    determining that the particular optical signal is valid based on the average peak-to-floor ratio and an average ratio threshold.

19. The method of claim 13, further comprising:
    calculating a minimum peak-to-floor ratio of the calculated peak-to-floor ratios of each slice of the plurality of slices; and
    determining that the particular optical signal is valid if the minimum peak-to-floor ratio is above a minimum ratio threshold.

20. The method of claim 13, further comprising:
    determining a sensing range of the particular optical signal, the sensing range being one or more bandwidth of the particular optical signal having one or more activated channel outside of a guard band; and
    wherein discretizing the particular optical signal further includes discretizing the sensing range into the plurality of slices.

21. The method of claim 20, wherein determining a sensing range of the particular optical signal, further includes determining a sensing range of the particular optical signal, the sensing range being one or more bandwidth of the particular optical signal having one or more activated channel outside of a guard band, the guard band being one or more of a channel guard band, channel roll-off guard band, wavelength selective switch guard band, and single channel uncertainty guard band.

* * * * *